W. H. COOK.
SHOCK ABSORBER FOR AUTOMOBILES.
APPLICATION FILED SEPT. 10, 1912.
1,058,412.
Patented Apr. 8, 1913.
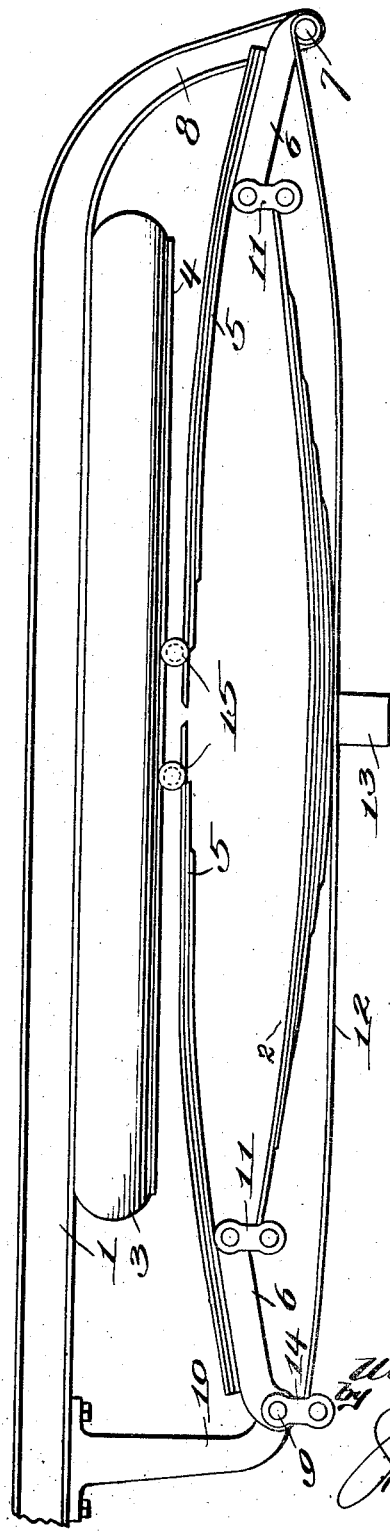
Witnesses:
Inventor
Walter H. Cook
by
Atty.

UNITED STATES PATENT OFFICE.

WALTER H. COOK, OF NEW ORLEANS, LOUISIANA.

SHOCK-ABSORBER FOR AUTOMOBILES.

1,058,412.  Specification of Letters Patent.  Patented Apr. 8, 1913.

Application filed September 10, 1912. Serial No. 719,661.

*To all whom it may concern:*

Be it known that I, WALTER H. COOK, a citizen of the United States, residing at New Orleans, in the parish of Orleans and State of Louisiana, have invented new and useful Improvements in Shock-Absorbers for Automobiles, of which the following is a specification.

This invention relates to improvements in shock absorbers for automobiles, of the general type shown in my co-pending application, Serial No. 709,098, wherein an elongated pneumatic tube is employed as a cushioning element and is interposed between a side bar of the main frame and a shock transmitting element which is acted on by the main spring, the relation of the parts being such that a pronounced wave-like compression of the cushioning element and consequent shock absorbing action is secured, whereby practically all of the vibrations are eliminated.

The shock absorber herein proposed is extremely sensitive in its action and effectively takes care of those minor vibrations which are consequent to the action of the main spring, the latter being of ordinary weight and strength and, hence, having its resiliency unimpaired by the provision of the secondary shock absorbing devices to be described.

The invention comprehends as a shock transmitting means a pair of half springs which are connected to the main spring and a spring bar which engages the pneumatic cushion aforesaid and is acted on, from its center outward, by the half springs.

An embodiment of the invention is illustrated in the accompanying drawings, wherein the figure is a side elevation showing the parts in connection with a side bar of the frame of the vehicle.

The invention is shown as applied to the forward portions of the main frame, but it is equally as applicable to the rear portions of said frame.

The improved shock absorber is combined with each side bar 1 of the main frame and comprehends the main spring 2 and a pneumatic cushion 3, which consists of an elongated tube of heavy rubber of nearly the same length as the main spring and is disposed longitudinally between said spring and the adjacent bar 1, the bar 1, the spring 2, the cushion 3, and the other associated elements being in a common vertical plane.

The cushion 3 is directly disposed between the bar 1 and a spring bar 4, the latter constituting a support for said cushion which it substantially equals in length.

The bar 4 forms an element of the means for transmitting shocks to the cushion 3 and rests upon a pair of oppositely arranged half springs 5 which form the other elements of said means and have their outer ends secured to bars 6. One of the bars 6 is pivoted, as at 7, to the gooseneck 8 at the end of the bar 1, and the other bar 6 is pivoted as at 9 to a bracket 10, which depends from said bar 1. The half springs 5 are acted on and supported by the spring 2 and their inner ends are connected, as by links 11, to the outer ends of said spring.

The main spring 2 may be, and preferably is arranged in the manner shown in my said co-pending application, Serial No. 709,098. In such a case, the direct support for the main spring comprises a spring bar 12, which, in effect, forms a part of said spring, having the same general direction of curvature, but being of greater length and having its central portion connected to the axle 13 and also to the overlying central portion of said spring. The bar 12, at its outer end, is joined, as by the pivot 7 aforesaid, to the gooseneck 8, and at its inner end is connected, as by a link 14, to the bracket 10, the link 14, as a matter of convenience, hanging from the pivot 9. The link 14 allows the bar 12 to have suitable freedom of motion under the thrust or pull of the car, and said bar consequently holds the main spring 2 at all times in proper position to efficiently receive the first vibratory impulses that may result from the shocks which the vehicle encounters.

The mutually adjacent free ends of the half springs 5 are somewhat closely associated and bear against the central portion of the bar 4. The springs 5 may bear directly against said bar or, under some circumstances, bearing rollers 15 may be interposed, as shown, to relieve friction. The rollers 15 are flanged at their ends, the flanges engaging over the sides of the bar 4 and the half springs 5 and thereby preventing lateral displacement of said rollers. The links 11 at each end of the spring 2 form connecting supports for the half springs 5, which, owing to their relation to the bar 4, cause said bar to act as a balanced bed for the cushion 3.

It is apparent that the half springs 5 act upon the bar 4 from the center of said bar outwardly toward both its ends and that the bar 4, consequent to the action of the springs 5, will be bowed and its end portions will be sprung upward to a greater or less degree, in accordance with the intensity of the shocks which the springs 5 transmit. It follows that a wave-like compression of the cushion 3 from the center outwardly is obtained. The provision of the bar 12 refines or modifies the action of the main spring and the pulsations of the latter are gradually and sensitively transmitted to the cushion 3 by the springs 5 and the bar 4. The shock transmitting elements themselves take up some of the shocks or vibrations and, owing to the wave-like compression of the cushion 3, any remaining vibrations are finally absorbed.

The spring 2 has, as will be noted, free action when a shock is first received, and it is only after it has performed its full function that the shock passes to the air tube, wherein the last of its vibrations are absorbed. It will, moreover, be noted that the construction above described and other constructions within the purview of the invention do not entail any stiffening of the main spring beyond the strength required to properly carry its load, but provide for taking up shocks or vibrations which may prove greater than its capacity to care for and absorb.

Having fully described my invention, I claim:

1. In a shock absorber, the combination with a side bar of the main frame and with a longitudinally disposed main spring, of a longitudinally disposed pneumatic cushion which bears against the side bar, and shock transmitting means comprising a longitudinally disposed bar upon which the cushion rests and opposed half springs having their free ends directed toward the center of said last named bar and acting thereon, the half springs being connected to the ends of the main spring.

2. In a shock absorber, the combination with a side bar of the main frame and with a longitudinally disposed main spring, of a longitudinally disposed pneumatic cushion which bears against the side bar, shock transmitting means comprising a longitudinally disposed bar upon which the cushion rests, and opposed half springs pivotally supported at their outer ends and having their free ends directed toward the center of said last named bar and acting thereon, and links connecting the half springs and the outer ends of said main spring.

3. In a shock absorber, the combination with a side bar of the main frame and with a longitudinally disposed main spring, of a longitudinally disposed pneumatic cushion which bears against the side bar, shock transmitting means comprising a longitudinally disposed bar upon which the cushion rests and opposed half springs having their free ends directed toward the center of said last named bar and acting thereon, the half springs being connected to the ends of the main spring, and rollers interposed between the half springs and said last named bar.

4. In a shock absorber, the combination with a side bar of the main frame and with a longitudinally disposed main spring, of a longitudinally disposed pneumatic cushion which bears against the side bar, shock transmitting means comprising a longitudinally disposed bar upon which the cushion rests and opposed half springs having their free ends directed toward the center of said last named bar and acting thereon, the half springs being connected to the ends of the main spring, a spring bar upon which the main spring rests and which is supported at its ends, one of the end supports for said bar comprising a pendant link.

In testimony whereof I have hereunto set my hand in presence of two subscribing witnesses.

WALTER H. COOK.

Witnesses:
THOMAS R. RICHARDSON,
ROBERT WATERMAN.

---

Copies of this patent may be obtained for five cents each, by addressing the "Commissioner of Patents, Washington, D. C."